(12) United States Patent
Khanin et al.

(10) Patent No.: US 9,287,818 B2
(45) Date of Patent: Mar. 15, 2016

(54) SIX-PHASE AC INDUCTION MOTOR DRIVE SYSTEM AND METHOD THEREFOR

(71) Applicant: Baldor Electric Company, Fort Smith, AR (US)

(72) Inventors: Mikhail D. Khanin, Fort Smith, AR (US); Edward N. Rowan, Greenwood, AR (US); Zhiguo Pan, Cary, NC (US)

(73) Assignee: Baldor Electric Company, Fort Smith, AR (US)

( * ) Notice: Subject to any disclaimer, the term of this patent is extended or adjusted under 35 U.S.C. 154(b) by 82 days.

(21) Appl. No.: 14/319,519

(22) Filed: Jun. 30, 2014

(65) Prior Publication Data
US 2015/0381099 A1 Dec. 31, 2015

(51) Int. Cl.
| | |
|---|---|
| *H02P 25/00* | (2006.01) |
| *H02K 21/12* | (2006.01) |
| *H02P 25/22* | (2006.01) |
| *H02P 6/00* | (2006.01) |
| *H02K 1/27* | (2006.01) |
| *H02P 3/18* | (2006.01) |

(52) U.S. Cl.
CPC ............ *H02P 25/22* (2013.01); *H02P 6/002* (2013.01); *H02K 1/278* (2013.01); *H02P 3/18* (2013.01)

(58) Field of Classification Search
CPC .......... H02P 25/22; H02P 6/002; H02P 1/46; H02P 3/18; H02P 3/24; H02P 6/001; H02P 27/08; H02K 1/278; H02K 21/46; H02K 7/003; H02K 3/28; F16D 1/003; B64C 25/405; Y02T 50/823
USPC ............. 318/400.41, 432, 705, 63; 310/195, 310/179, 198, 75 D; 702/173, 175; 244/135 A; 464/88
See application file for complete search history.

(56) References Cited

U.S. PATENT DOCUMENTS

| | | | |
|---|---|---|---|
| 6,710,495 | B2 | 3/2004 | Lipo et al. |
| 6,864,661 | B2 | 3/2005 | Edelson |
| 2003/0085627 | A1 | 5/2003 | Lipo et al. |
| 2007/0273234 | A1* | 11/2007 | Melfi ............... H02K 1/278 310/156.53 |

(Continued)

OTHER PUBLICATIONS

Marouani et al., "A New PWM Strategy Based on a 24-Sector Vector Space Decomposition for a Six-Phase VSI-Fed Dual Stator Induction Motor", IEEE Transactions on Industrial Electronics, May 2008, pp. 1910-1920, vol. 55 No. 5.

(Continued)

*Primary Examiner* — Bentsu Ro
*Assistant Examiner* — Zemenay Truneh
(74) *Attorney, Agent, or Firm* — Thompson Coburn LLP (57) ABSTRACT

A drive system powers a six-phase AC induction motor having a plurality of poles and a stator with a plurality of teeth where the number of teeth divided by six times the number of poles equals an integer number. The stator core has first and second groups of three-phase stator windings. The second group of three-phase windings is separated spatially by 30 electrical degrees from the first group. A first power supply is connectable to the first group of three-phase windings. A second power supply is connectable to the second group of three-phase windings. The second power supply provides power to the second group of three-phase windings that is shifted by 30 electrical degrees in time with respect to the first power supply. The first and second power supplies receive signals from identical pulse width modulator generators. The respective first and second pulse width modulator generators receive commands from one controller.

31 Claims, 10 Drawing Sheets

(56) References Cited

U.S. PATENT DOCUMENTS

| | | | |
|---|---|---|---|
| 2008/0079373 A1* | 4/2008 | Melfi | H02P 3/18 318/63 |
| 2010/0054971 A1 | 3/2010 | Li et al. | |
| 2012/0206076 A1 | 8/2012 | Tanaka | |

OTHER PUBLICATIONS

Bojoi et al, "Digital Synchronous Frame Current Regulation for Dual Three-Phase Induction Motor Drives", Conference: Power Electronics Specialist Conference, 2003, pp. 1475-1480, vol. 3.

* cited by examiner

| Coil | Slot Start | Slot End | | Coil | Slot Start | Slot End |
| --- | --- | --- | --- | --- | --- | --- |
| A | 1 | 12 | | A | 24 | 13 |
| A | 2 | 13 | | A | 25 | 14 |
| A+π/6 | 3 | 14 | | A+π/6 | 26 | 15 |
| A+ π/6 | 4 | 15 | | A+ π/6 | 27 | 16 |
| B | 16 | 5 | | B | 17 | 28 |
| B | 17 | 6 | | B | 18 | 29 |
| B+ π/6 | 18 | 7 | | B+ π/6 | 19 | 30 |
| B+ π/6 | 19 | 8 | | B+ π/6 | 20 | 31 |
| C | 9 | 20 | | C | 32 | 21 |
| C | 10 | 21 | | C | 33 | 22 |
| C+ π/6 | 11 | 22 | | C+ π/6 | 34 | 23 |
| C+ π/6 | 12 | 23 | | C+ π/6 | 35 | 24 |

| Coil | Slot Start | Slot End | | Coil | Slot Start | Slot End |
|---|---|---|---|---|---|---|
| A | 1 | 17 | | A | 35 | 19 |
| A | 2 | 18 | | A | 36 | 20 |
| A | 3 | 19 | | A | 37 | 21 |
| A+ $\pi/6$ | 4 | 20 | | A+ $\pi/6$ | 38 | 22 |
| A+ $\pi/6$ | 5 | 21 | | A+ $\pi/6$ | 39 | 23 |
| A+ $\pi/6$ | 6 | 22 | | A+ $\pi/6$ | 40 | 24 |
| B | 23 | 7 | | B | 25 | 41 |
| B | 24 | 8 | | B | 26 | 42 |
| B | 25 | 9 | | B | 27 | 43 |
| B+ $\pi/6$ | 26 | 10 | | B+ $\pi/6$ | 28 | 44 |
| B+ $\pi/6$ | 27 | 11 | | B+ $\pi/6$ | 29 | 45 |
| B+ $\pi/6$ | 28 | 12 | | B+ $\pi/6$ | 30 | 46 |
| C | 13 | 29 | | C | 47 | 31 |
| C | 14 | 30 | | C | 48 | 32 |
| C | 15 | 31 | | C | 49 | 33 |
| C+ $\pi/6$ | 16 | 32 | | C+ $\pi/6$ | 50 | 34 |
| C+ $\pi/6$ | 17 | 33 | | C+ $\pi/6$ | 51 | 35 |
| C+ $\pi/6$ | 18 | 34 | | C+ $\pi/6$ | 52 | 36 |

| Coil | Slot Start | Slot End | | Coil | Slot Start | Slot End |
|---|---|---|---|---|---|---|
| A | 1 | 18 | | A | 36 | 19 |
| A | 2 | 19 | | A | 37 | 20 |
| A | 3 | 20 | | A | 48 | 21 |
| A+ $\pi/6$ | 4 | 21 | | A+ $\pi/6$ | 49 | 22 |
| A+ $\pi/6$ | 5 | 22 | | A+ $\pi/6$ | 40 | 23 |
| A+ $\pi/6$ | 6 | 23 | | A+ $\pi/6$ | 41 | 24 |
| B | 24 | 7 | | B | 25 | 42 |
| B | 25 | 8 | | B | 26 | 43 |
| B | 26 | 9 | | B | 27 | 44 |
| B+ $\pi/6$ | 27 | 10 | | B+ $\pi/6$ | 28 | 45 |
| B+ $\pi/6$ | 28 | 11 | | B+ $\pi/6$ | 29 | 46 |
| B+ $\pi/6$ | 29 | 12 | | B+ $\pi/6$ | 30 | 47 |
| C | 13 | 30 | | C | 48 | 31 |
| C | 14 | 31 | | C | 49 | 32 |
| C | 15 | 32 | | C | 50 | 33 |
| C+ $\pi/6$ | 16 | 33 | | C+ $\pi/6$ | 51 | 34 |
| C+ $\pi/6$ | 17 | 34 | | C+ $\pi/6$ | 52 | 35 |
| C+ $\pi/6$ | 18 | 35 | | C+ $\pi/6$ | 53 | 36 |

SIX-PHASE AC INDUCTION MOTOR DRIVE SYSTEM AND METHOD THEREFOR

BACKGROUND AND SUMMARY

The following disclosure relates to a six-phase AC induction motor drive system. Specifically, the disclosure relates to a drive for a six-phase motor which has a single controller configuration that sends command signals to respective pulse width modulator generators associated with two three-phase power base drive sections.

Figure 1:
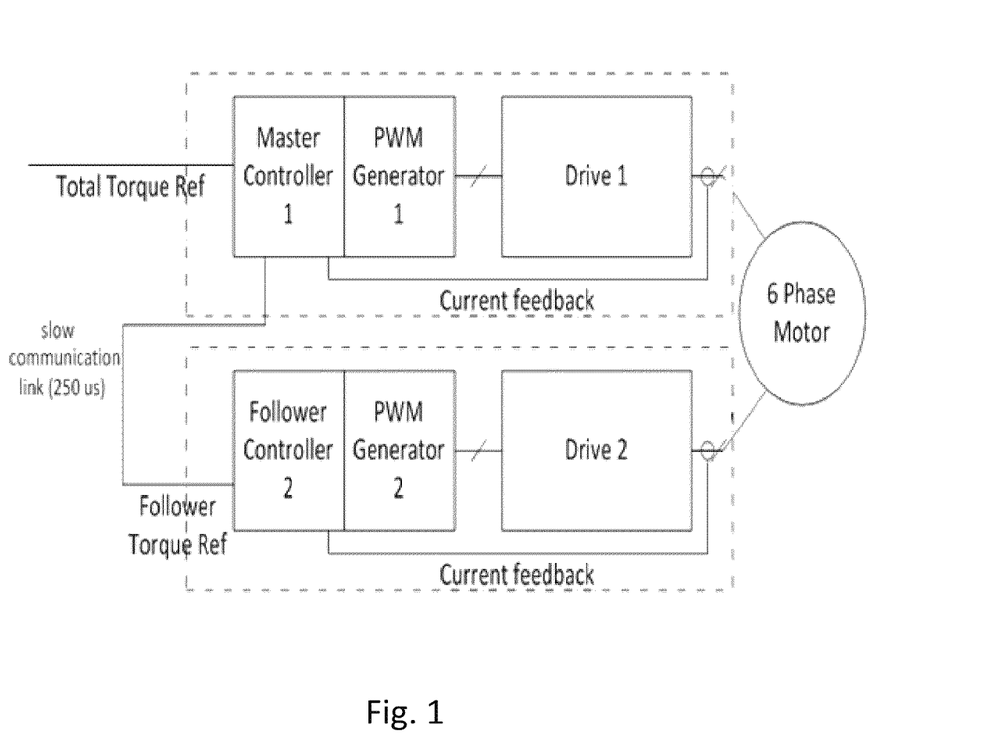
FIG. 1 is a schematic drawing of a drive system for a six-phase AC induction motor-drive system utilizing a master and follower architecture for controlling respective pulse width modulator generators associated with two three-phase power base drive sections.

FIG. 1 shows a drawing of a drive system for a six-phase AC induction motor utilizing a master and follower architecture for controlling the pulse width modulator generators associated with the drive system. The two drives are each controlled by their respective controller. Command signals are sent to each power base drive section by a respective controller. The follower controller receives command signals from the master controller, and subsequently provides command signals to its pulse width modulator generator in a shift of 30 electrical degrees in time. Although the master and follower controllers and the power base drive sections may be same model type provided by the same manufacturer, and the follower controller theoretically provides signals to its pulse width modulator generator in a precise and accurate shift of 30 electrical degrees in time relative to the master controller, slight variations in controllers and the system in general, for instance, the clocks associated with the CPUs of the controllers, nonetheless create variation which tends to destabilize and desynchronize the drive system.

The disclosure that follows provides a methodology to allow synchronizing of two three-phase power base drive sections to produce a reliable six (6) phase power system for induction loads. The disclosure herein allows for: (i) an increase in energy efficiency of an AC induction motor-drive system, (ii) a higher output power than an equivalent three-phase system operating at the same temperature and efficiency, and (iii) an extension of the life of motor winding installation for the motor of the corresponding system.

DETAILED DESCRIPTION

The exemplary motor-drive system may comprise a six-phase AC induction motor powered by a six phase drive system having two three phase drive sections controlled by a single controller. The single controller may be configured to provide power to two, three-phase winding groups X,Y associated with a stator of the motor. The power provided to the two, three-phase winding groups X,Y of the stator may be shifted by 30 electrical degrees in time. The two sets of three-phase winding groups X,Y may be wound on the stator so that the two sets are spatially shifted by 30 electrical degrees. One such system which has proven useful comprises a single controller controlling two three-phase power converters. The two three-phase power converters may be configured to operate in an open or closed loop mode. Each three-phase power converter is controlled from a single, common controller that sends consistent commands to the pulse width modulator generators associated with the respective three-phase power base drive section. Other drives capable of being integrated with a single controller that generates command signals to the pulse width modulator generators of each three-phase power base drive section may also be utilized. The single controller allows the system to maintain synchronization between the power base drive sections and each of three-phase winding groups by generating commands to the respective pulse width modulator generators at the precise shift of 30 electrical degrees in time.

Figure 2:
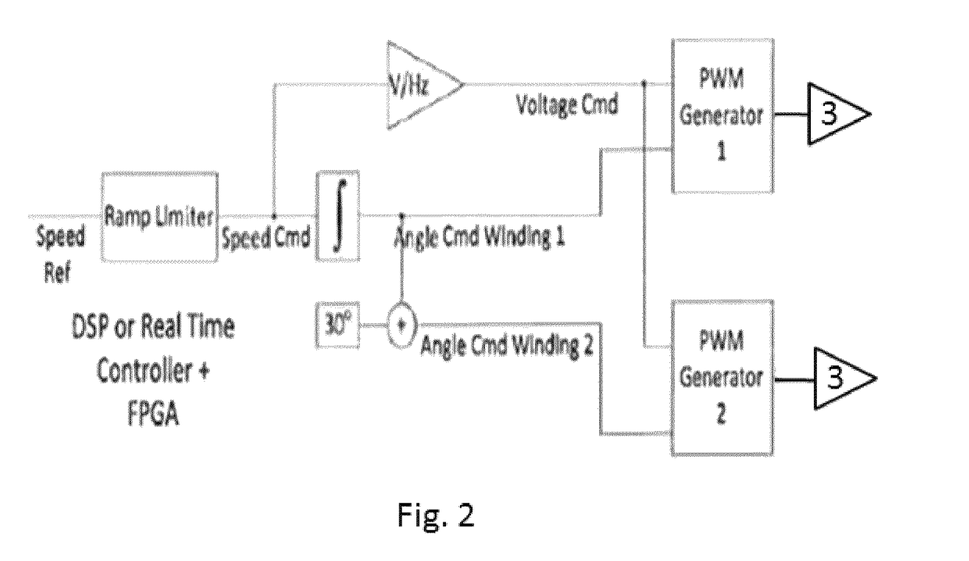
FIGS. 2-3 are schematic drawings of an exemplary open-loop drive system for a six-phase AC induction motor.
Figure 3:
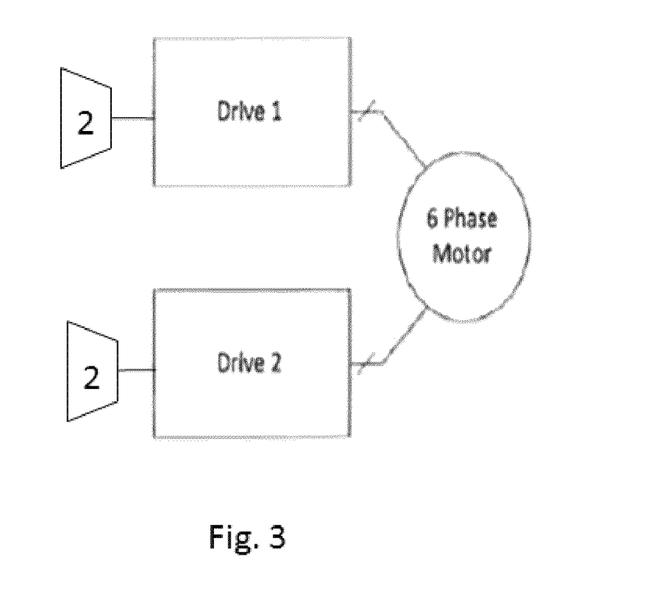

FIGS. 2 and 3 show a schematic drawing of a six-phase AC induction motor drive system using an open loop controller. The angle command for both of the three-phase winding groups X,Y is calculated based upon a speed reference. Because there is a 30 electrical degree in time phase shift between winding group X and winding group Y, winding group Y is spatially shifted by 30 degrees from winding group X on the stator. The corresponding, angle command for winding group Y is 30 degrees greater than that for winding group X. After the angle commands are calculated, both angle commands are sent to identical pulse width modulator generators of the control to generate pulse width modulated gate signals for each of the respective three-phase power base drive sections.

Figure 4:
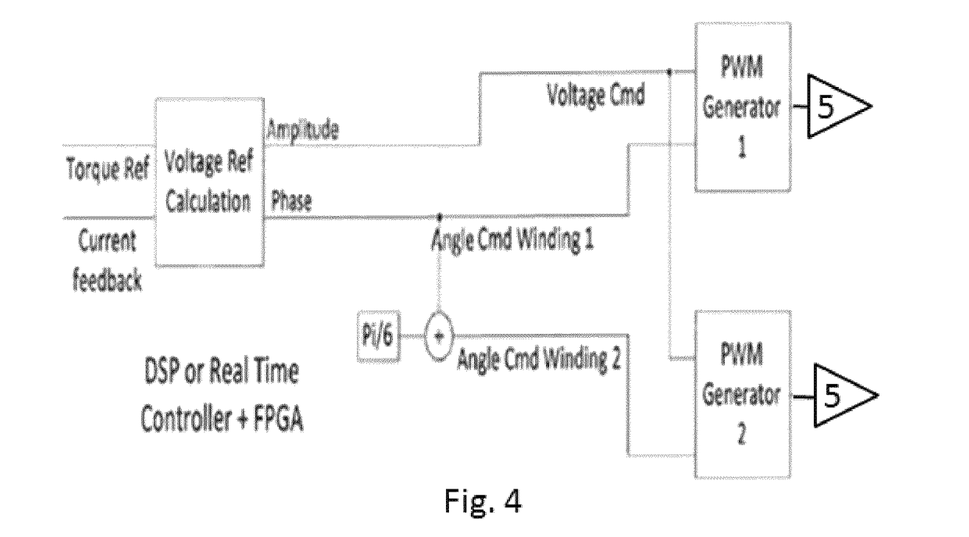
FIGS. 4-5 are schematic drawings of an exemplary closed-loop drive system for a six-phase AC induction motor.
Figure 5:
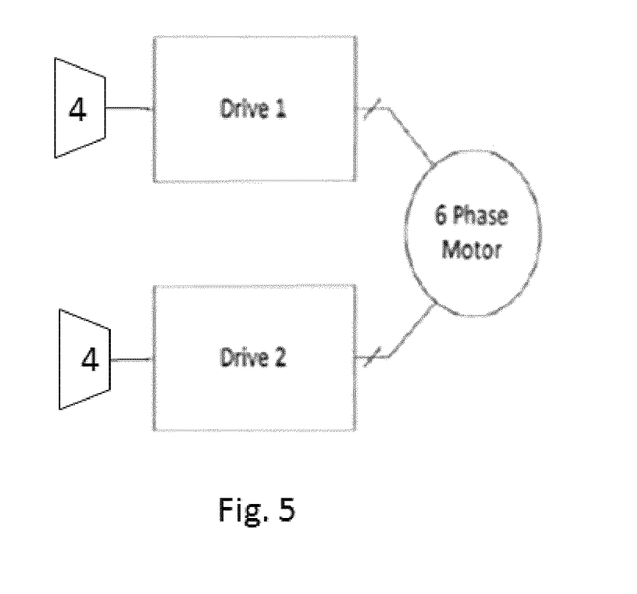

FIGS. 4 and 5 show a schematic drawing of a six-phase AC induction motor drive system using an alternate control scheme comprising a closed loop vector control. The angle command for both of the three-phase winding groups X,Y is calculated based upon a torque reference. Because there is a 30 electrical degree phase shift between winding group X and winding group Y, winding group Y is spatially shifted by 30 degrees from winding group X on the stator. The corresponding angle command for winding group Y is 30 degrees greater than that for winding group X. After the angle commands are calculated, both angle commands are sent to identical pulse width modulator generators of the control to generate pulse width modulated gate signals for each of the respective three-phase drive power sections.

The stator may be configured such that the number of slots (T) per pole (P) per phase (PH) associated with the stator (i.e., T/P/PH) equals an integral number. For instance, in the example of a 4 pole, 6 phase motor, with a 48 slot stator, the integer number is 2. In the example of a 4 pole, 6 phase motor, with a 72 slot stator, the integer number is 3. In the example of a 6 phase motor, the number of slots (T) divided by six times the number of poles (P) may be an integer number (i.e., T/(6×P)). The two, three-phase winding groups X,Y may be wound on the stator using a short pitch winding pattern. For instance, a 48 slot stator may be wound with an 11 stator tooth pitch winding pattern. A 72 slot stator may be wound with a 16 stator tooth pitch winding pattern or a 17 stator tooth pitch winding pattern.

Figure 6:
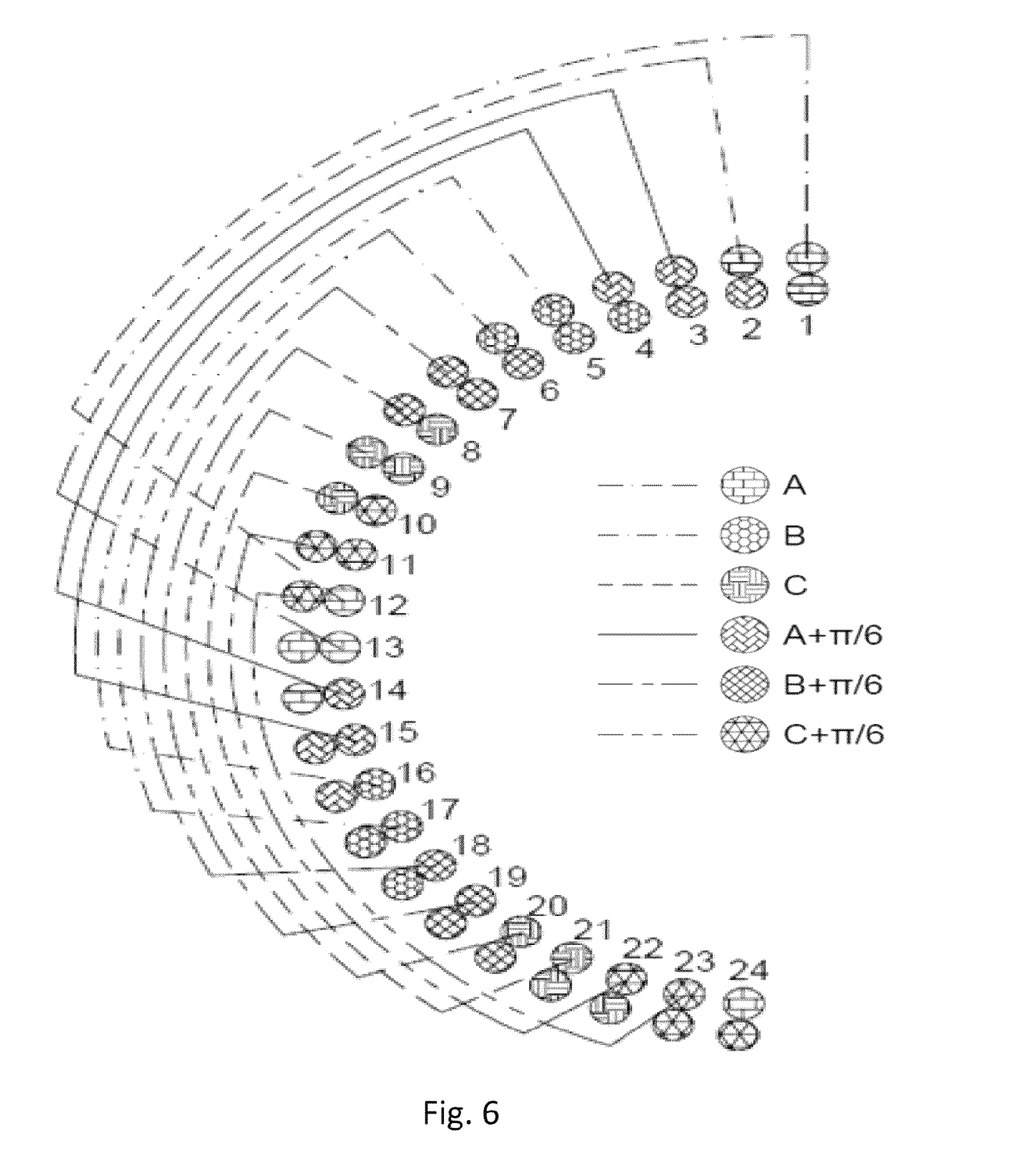
FIG. 6 is a winding diagram associated with one embodiment of a stator of a six phase AC induction motor wherein the stator comprises a 48 slot stator with two three-phase windings groups wound using an 11 stator tooth pitch winding pattern.
Figure 7:
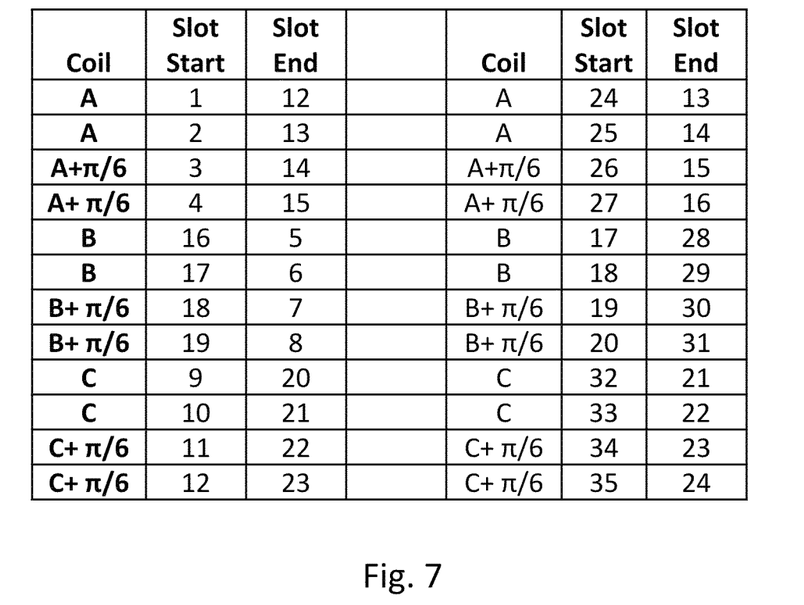
FIG. 7 is a chart associated with the winding diagram of FIG. 6.

FIG. 6 shows a winding diagram for the two three-phase winding groups X,Y of a 48 slot stator using an 11 stator tooth pitch winding pattern. Half of the stator represented by slots 1-24 is shown in FIG. 6, and the pattern would be followed in repeating sequence for slots 25-48 (not shown). The three phase windings of winding group X are indicated by phase windings A, B, and C, and are driven by power base drive section 1. The three phase windings of winding group Y are indicated by phase windings (A+π/6) (hereinafter A'), (B+π/6) (hereinafter B'), and (C+π/6) (hereinafter C'), and are driven by power base drive section 2. As shown in FIG. 6 (radially outward to radially inward in the slot), slot 1 contains phase windings A and A; slot 2 contains phase windings A and A'; slot 3 contains phase windings A' and A'; slot 4 contains phase windings A' and B; slot 5 contains phase windings B and B; slot 6 contains phase windings B and B'; slot 7 contains phase windings B' and B'; slot 8 contains phase windings B' and C; slot 9 contains phase windings C and C; slot 10 contains phase windings C and C'; slot 11 contains C' and C'; and slot 12 contains phase windings C' and A. Slot 13 has the same configuration as slot 1, and the pattern repeats for remaining slots of the motor. Thus, slot 25 and slot 37 have the same configuration as slots 1 and 13. The start and termination point for each of the windings is shown on FIGS. 6 and 7. For instance, phase winding A starts as the top phase winding of slot 1 and terminates as the bottom phase winding of slot 12; phase winding A starts as the top phase winding of slot 2 and terminates as the bottom phase winding of slot 13; and phase winding B starts as the top phase winding of slot 3 and terminates as the bottom phase winding of slot 14. The start and termination points are in accordance with the 11 stator tooth pitch winding pattern and repeat for the other slots of the stator.

Figure 8:
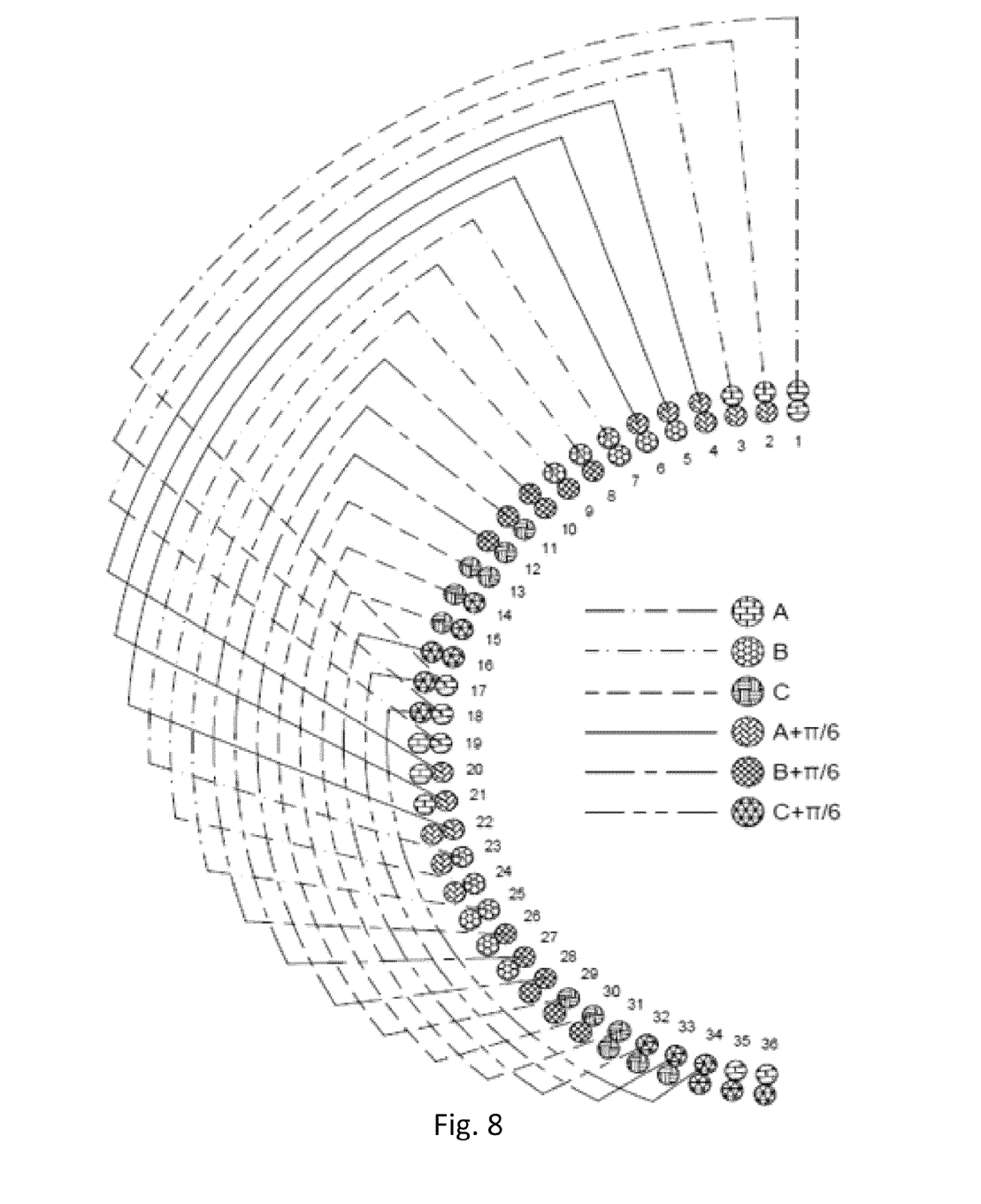
FIG. 8 is a winding diagram associated with another embodiment of a stator of a six phase AC induction motor wherein the stator comprises a 72 slot stator with two three-phase windings groups wound using a 16 stator tooth pitch winding pattern.
Figure 9:
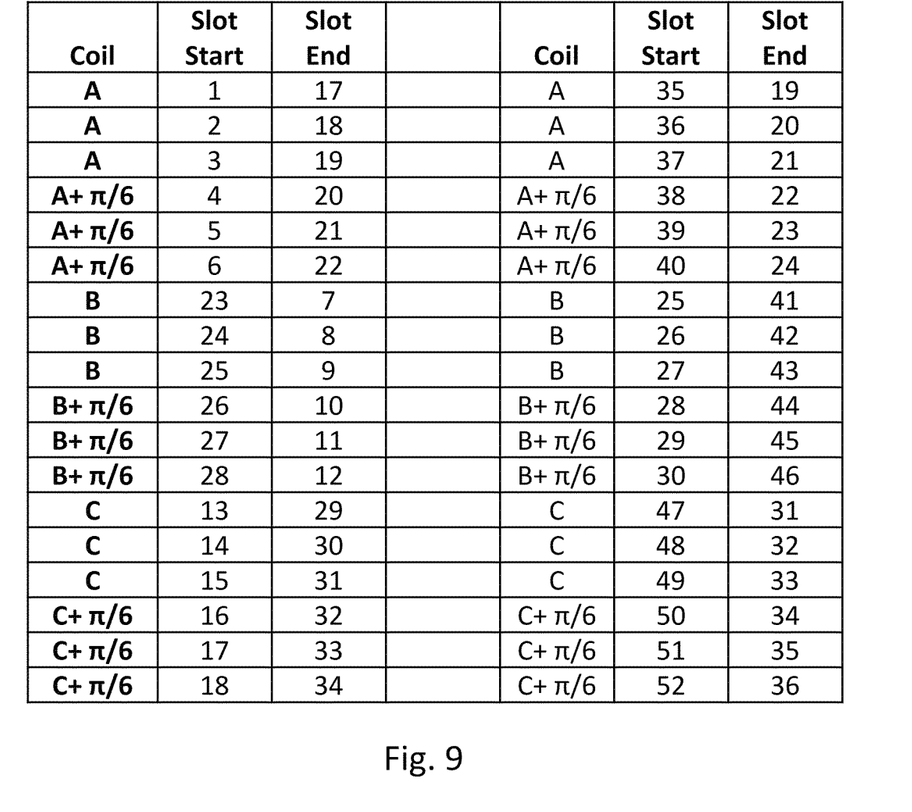
FIG. 9 is a chart associated with the winding diagram of FIG. 8.

FIG. 8 shows a winding diagram for the two three-phase winding groups X,Y of a 72 slot stator using an 16 stator tooth pitch winding pattern. Half of the stator represented by slots 1-36 is shown in FIG. 8, and the pattern would be followed in repeating sequence for slots 37-72 (not shown). The three phase windings of winding group X are indicated by phase windings A, B, and C, and are driven by power base drive section 1. The three phase windings of winding group Y are indicated by phase windings (A+π/6) (hereinafter A'), (B+π/6)(hereinafter B'), and (C+π/6) (hereinafter C'), and are driven by power base drive section 2. As shown in FIG. 8 (radially outward to radially inward in the slot), slot 1 contains phase windings A and A; slot 2 contains phase windings A and A'; slot 3 contains phase windings A and A'; slot 4 contains phase windings A' and A'; slot 5 contains phase windings A' and B; slot 6 contains phase windings A' and B; slot 7 contains phase windings B and B; slot 8 contains phase windings B and B'; slot 9 contains phase windings B and B'; slot 10 contains phase windings B' and B'; slot 11 contains phase windings B' and C; slot 12 contains phase windings B' and C; slot 13 contains phase windings C and C; slot 14 contains phase windings C and C'; slot 15 contains phase windings C and C'; slot 16 contains phase windings C' and C'; slot 17 contains phase windings C' and A; and slot 18 contains phase windings C' and A. Slot 19 has the same configuration as slot 1, and the pattern repeats for remaining slots of the motor. Thus, slot 37 and slot 55 have the same configuration as slots 1 and 19. The start and termination point for each of the windings is shown on FIGS. 8 and 9. For instance, phase winding A starts as the top phase winding of slot 1 and terminates as the bottom phase winding of slot 17; phase winding A starts as the top phase winding of slot 2 and terminates as the bottom phase winding of slot 18; and phase winding A starts as the top phase winding of slot 3 and terminates as the bottom phase winding of slot 19. The start and termination points are in accordance with the 16 stator tooth pitch winding pattern and repeat for the other slots of the stator.

Figure 10:
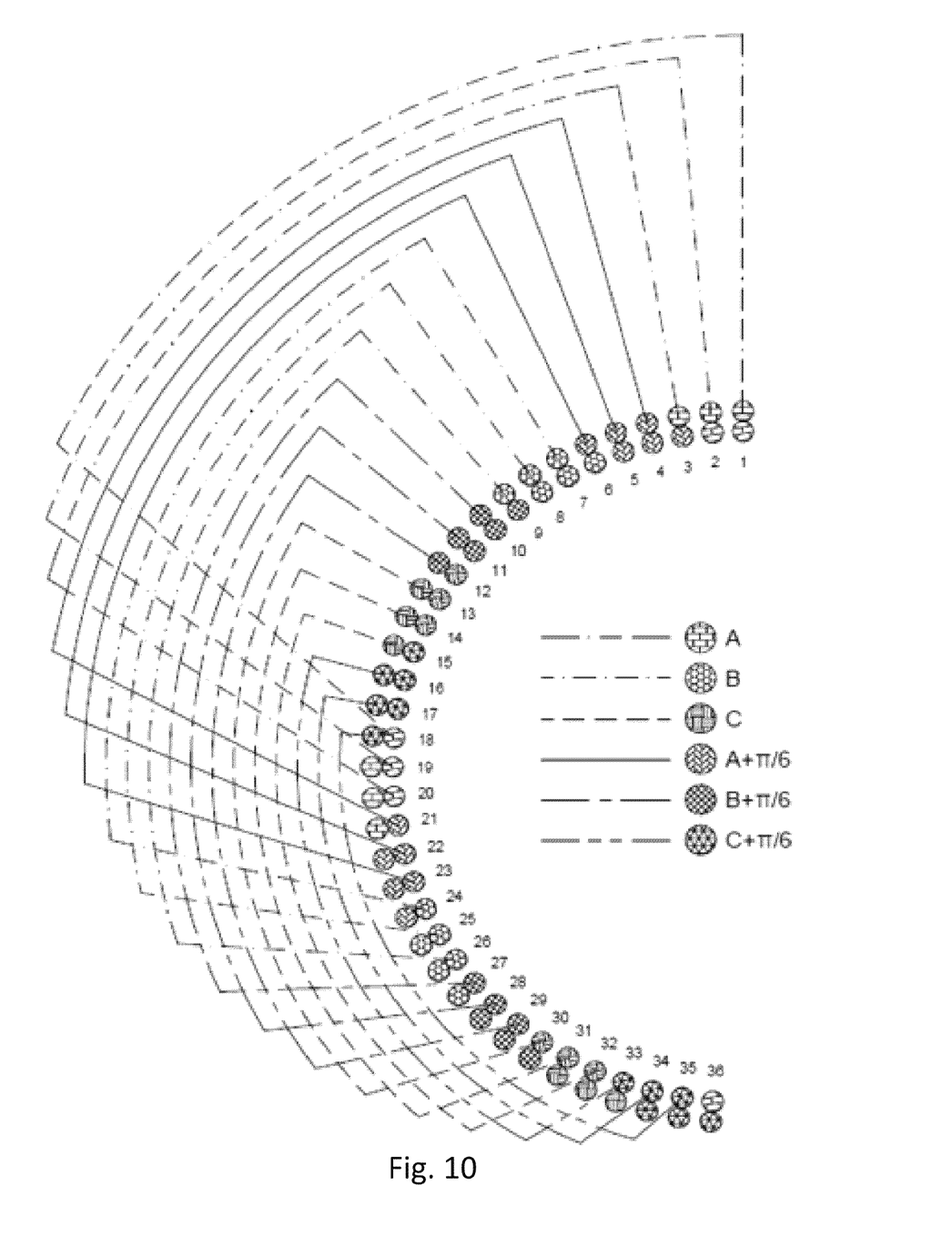
FIG. 10 is a winding diagram associated with another embodiment of a stator of a six phase AC induction motor wherein the stator comprises a 72 slot stator with two three-phase windings groups wound using a 17 stator tooth pitch winding pattern.
Figure 11:
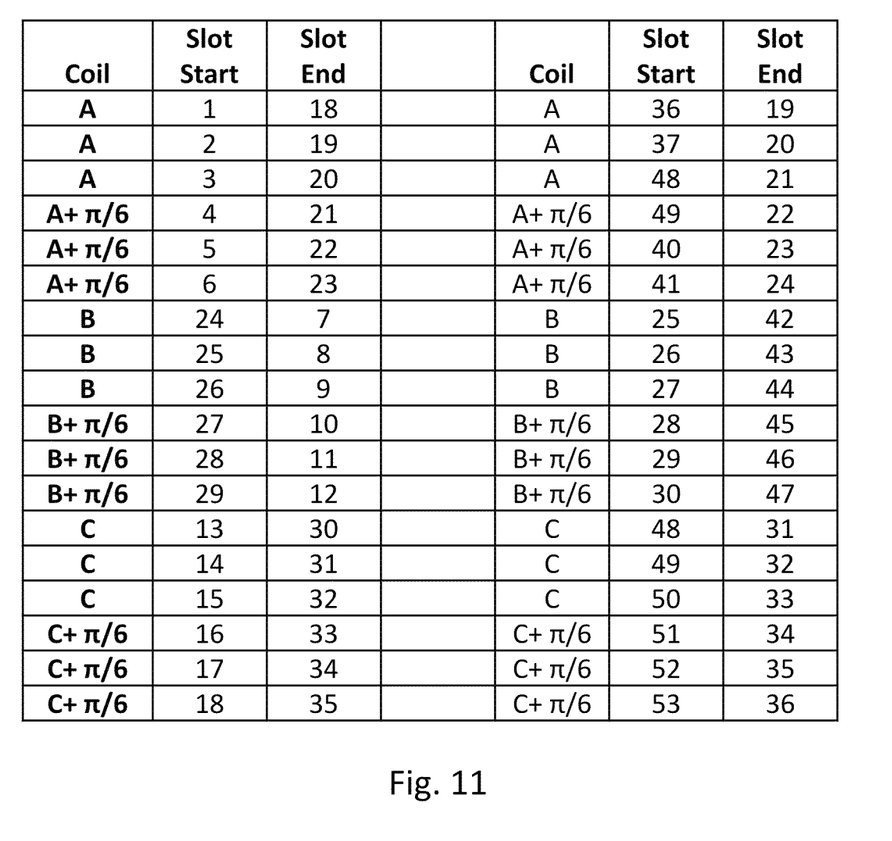
FIG. 11 is a chart associated with the winding diagram of FIG. 10.

FIG. 10 shows a winding diagram for the two three-phase winding groups X,Y of a 72 slot stator using a 17 stator tooth pitch winding pattern. Half of the stator represented by slots 1-36 is shown in FIG. 10, and the pattern would be followed in repeating sequence for slots 37-72 (not shown). The three phase windings of winding group X are indicated by phase windings A, B, and C, and are driven by power base drive section 1. The three phase windings of winding group Y are indicated by phase windings (A+π/6) (hereinafter A'), (B+π/6) (hereinafter B'), and (C+π/6) (hereinafter C'), and are driven by power base drive section 2. As shown in FIG. 10 (radially outward to radially inward in the slot), slot 1 contains phase windings A and A; slot 2 contains phase windings A and A; slot 3 contains phase windings A and A'; slot 4 contains phase windings A' and A'; slot 5 contains phase windings A' and A'; slot 6 contains phase windings A' and B; slot 7 contains phase windings B and B; slot 8 contains phase windings B and B; slot 9 contains phase windings B and B'; slot 10 contains phase windings B' and B'; slot 11 contains phase windings B' and B'; slot 12 contains phase windings B' and C; slot 13 contains phase windings C and C; slot 14 contains phase windings C and C; slot 15 contains phase windings C and C'; slot 16 contains phase windings C' and C'; slot 17 contains phase windings C' and C'; and slot 18 contains phase windings C' and A. Slots 19 and 20 have the same configuration as slots 1 and 2, and the pattern repeats for remaining slots of the motor. Thus, slot 37 and slot 55 have the same configuration as slots 1 and 19. The start and termination point for each of the windings is shown on FIGS. 10 and 11. For instance, phase winding A starts as the top phase winding of slot 1 and terminates as the bottom phase winding of slot 18; phase winding A starts as the top phase winding of slot 2 and terminates as the bottom phase winding of slot 19; and phase winding A starts as the top phase winding of slot 3 and terminates as the bottom phase winding of slot 20. The start and termination points are in accordance with the 17 stator tooth pitch winding pattern and repeat for the other slots of the stator.

Example

Figure 12:
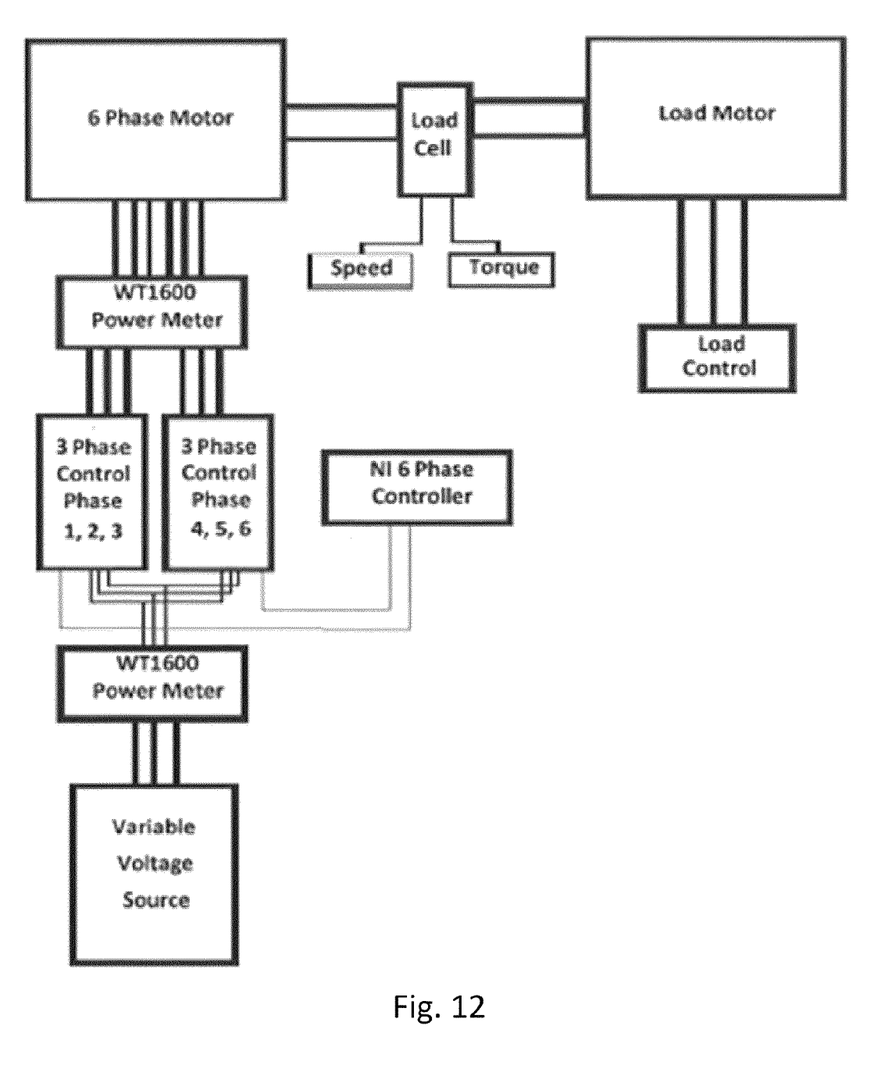
FIG. 12 is a schematic drawing showing location points for obtaining measurements to confirm the performance of a six-phase motor drive system.

An AC induction motor comprising a NEMA 320-frame, 41 horsepower, 50 Hz, 6 phase, 4 pole, 48 slot stator, with two, three-phase winding groups wound with an 11 stator tooth pitch winding pattern, was powered with a drive system comprising two ACS 880 power base drive sections (provided by ABB) with a single controller configured to provide an open loop control, for instance, as shown in FIGS. 2 and 3. In accordance with the schematic drawing of FIG. 12, measurements of load speed and torque, power from each three-phase base power drive sections, and control signals from each pulse width modulator generator were obtained instantaneously at 0.05 second intervals over a ten minute period. When comparing the performance of the subject six phase system against a comparable three phase system using a premium efficiency three phase motor, the efficiency of the six-phase system was found to be up to 2 percent (2%) higher. The subject six-phase system was also found to have a 25 percent (25%) higher power output than the same frame size three-phase system using a premium efficiency three phase motor operating at rated power at the same temperature and efficiency. Life expectancy of winding insulation of the subject six-phase system is projected to be twice that of the comparable three-phase system due to a lower operating temperature of the six-phase motor for the same output power.

The embodiments were chosen and described in order to best explain the principles and their application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A motor drive system comprising:
  a six phase alternating current induction motor having a plurality of poles (P) and a stator with a core having a plurality of teeth (T) with the number of teeth divided by 6 times the number of poles (T/(6×P)) equaling an integer number, the core having first and second groups of three-phase stator windings wound thereon in a short pitch winding pattern, the first group of three-phase windings separated spatially by 30 electrical degrees from the second group of three-phase windings;
  a first power supply connected to the first group of three-phase windings;
  a second power supply connected to the second group of three-phase windings;
  wherein the second power supply provides power to the second group of three-phase windings that is shifted by 30 electrical degrees in time with respect to the power provided by the first power supply;
  wherein the first and second power supplies receive signals from respective identical pulse width modulator generators; and
  wherein the respective first and second pulse width modulator generators receive angle and voltage commands from one controller.

2. The motor drive system of claim 1, wherein the controller operates based upon a closed loop control scheme.

3. The motor drive system of claim 1, wherein the controller operates based upon an open loop control scheme.

4. The motor drive system of claim 1, wherein the angle commands are based upon a speed reference.

5. The motor drive system of claim 1, wherein the angle commands are based upon a torque reference.

6. The motor drive system of claim 1, wherein the controller receiving current feedback.

7. The motor drive system of claim 1, wherein the number of poles is 4.

8. The motor drive system of claim 7, wherein the stator comprises 48 slots.

9. The motor drive system of claim 8, wherein the first and second groups of windings are wound on the core with an 11 stator tooth pitch winding pattern.

10. The motor drive system of claim 7, wherein the stator comprises 72 slots.

11. The motor drive system of claim 10, wherein the first and second groups of windings are wound on the core with a 16 stator tooth pitch winding pattern.

12. The motor drive system of claim 10, wherein the first and second groups of windings are wound on the core with a 17 stator tooth pitch winding pattern.

13. A method of controlling a six phase alternating current induction motor having a plurality of poles (P) and a stator with a core having a plurality of teeth (T) with the number of teeth divided by six times the number of poles (T/(6×P)) equaling an integer number, the core having first and second groups of three-phase stator windings wound thereon in a short pitch winding pattern, the first group of three-phase windings is separated spatially by 30 electrical degrees from the second group of three-phase windings;
  applying a power from a first power supply to the first group of three-phase windings;
  applying power from a second power supply to the second group of three-phase windings;
  shifting by 30 electrical degrees in time the power applied from the second power supply to the second group of three-phase windings with respect to the power applied to the first group of three-phase winding by the first power supply;
  configuring the first and second power supplies to receive signals from respective identical pulse width modulator generators; and
  configuring the respective first and second pulse width modulator generators to receive angle and voltage commands from one controller.

14. The method of claim 13, wherein the step of configuring the respective first and second pulse width modulator generators to receive angle and voltage commands from one controller includes configuring the controller to operate based upon a closed loop control scheme.

15. The method of claim 13, wherein the step of configuring the respective first and second pulse width modulator generators to receive angle and voltage commands from one controller includes configuring the controller to operate based upon an open loop control scheme.

16. The method of claim 13, wherein the step of configuring the respective first and second pulse width modulator generators to receive angle and voltage commands from one controller includes configuring the angle commands based upon a speed reference.

17. The method of claim 13, wherein the step of configuring the respective first and second pulse width modulator generators to receive angle and voltage commands from one controller includes configuring the angle commands based upon a torque reference.

18. The method of claim 13, wherein the step of configuring the respective first and second pulse width modulator generators to receive angle and voltage commands from one controller includes configuring the controller to receive current feedback.

19. The method of claim 13, wherein the number of poles is 4.

20. The method of claim 19, wherein the stator comprises 48 slots.

21. The method of claim 20, wherein the first and second groups of windings are wound on the core with an 11 stator tooth pitch winding pattern.

22. The method of claim 19, wherein the stator comprises 72 slots.

23. The method of claim 22, wherein the first and second groups of windings are wound on the core with a 16 stator tooth pitch winding pattern.

24. The method of claim 22, wherein the first and second groups of windings are wound on the core with a 17 stator tooth pitch winding pattern.

25. A drive system adapted to be coupled to a motor, wherein the motor comprises a six phase alternating current induction motor having a plurality of poles (P), a stator with a core having a plurality of teeth (T) with the number of teeth divided by 6 times the number of poles (T/(6×P)) equaling an integer number, the core having first and second groups of three-phase stator windings wound thereon in a short pitch winding pattern, the second group of three-phase windings is separated spatially by 30 electrical degrees from the first group of three-phase windings, the drive system comprises:
- a first power supply configured to be connected to the first group of three-phase windings;
- a second power supply configured to be connected to the second group of three-phase windings;

wherein the second power supply provides power to the second group of three-phase windings that is shifted by 30 electrical degrees in time with respect to the power provided by the first power supply;

wherein the first and second power supplies receive signals from respective identical pulse width modulator generators; and wherein the respective first and second pulse width modulator generators receive angle and voltage commands from one controller.

26. The drive system of claim 25, wherein the controller operates based upon a closed loop control scheme.

27. The drive system of claim 25, wherein the controller operates based upon an open loop control scheme.

28. The drive system of claim 25, wherein the angle commands are based upon a speed reference.

29. The drive system of claim 25, wherein the angle commands are based upon a torque reference.

30. The drive system of claim 25, wherein the controller receiving current feedback.

31. The drive system of claim 25, wherein the number of poles is 4.

* * * * *